US008233940B2

(12) United States Patent
Shimomura et al.

(10) Patent No.: US 8,233,940 B2
(45) Date of Patent: Jul. 31, 2012

(54) BASE STATION EQUIPMENT, BASE STATION CONTROL EQUIPMENT AND COMMUNICATION SYSTEM

(75) Inventors: Takehiro Shimomura, Tokyo (JP); Kuniyuki Suzuki, Tokyo (JP); Keiji Okamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 767 days.

(21) Appl. No.: 12/297,116

(22) PCT Filed: Apr. 27, 2006

(86) PCT No.: PCT/JP2006/308889
§ 371 (c)(1),
(2), (4) Date: Oct. 14, 2008

(87) PCT Pub. No.: WO2007/125583
PCT Pub. Date: Nov. 8, 2007

(65) Prior Publication Data
US 2009/0181709 A1 Jul. 16, 2009

(51) Int. Cl.
*H04B 1/38* (2006.01)
(52) U.S. Cl. .................................. 455/561; 455/424
(58) Field of Classification Search .................. 455/509, 455/561, 424, 426.2, 438; 370/321, 347, 370/503, 252, 335, 342, 229
See application file for complete search history.

(56) References Cited

U.S. PATENT DOCUMENTS

| | | | | |
|---|---|---|---|---|
| 6,507,567 B1 * | 1/2003 | Willars | ......................... | 370/321 |
| 6,564,052 B1 * | 5/2003 | Kawano et al. | ............... | 455/424 |
| 7,535,932 B2 | 5/2009 | Ishii et al. | | |
| 8,045,590 B2 | 10/2011 | Ishii et al. | | |
| 2001/0043581 A1 * | 11/2001 | Antonio | ........................ | 370/335 |
| 2003/0103478 A1 * | 6/2003 | Eriksson | ....................... | 370/335 |
| 2003/0107989 A1 * | 6/2003 | Ray | ................. | 370/229 |
| 2004/0001472 A1 | 1/2004 | Kwak et al. | | |

(Continued)

FOREIGN PATENT DOCUMENTS
CN 1638310 A 7/2005
(Continued)

OTHER PUBLICATIONS

"Deriving Allocation Information for a Radio Link PAGEREF on Group Radio Access Network; UTRAN Iub interface Node B Application Part (NBAP) signaling (Release 6)", 3GPP TS 25. 433 V6.8.0, pp. 29-32, 51-54, 60-63, (Dec. 2005).

(Continued)

*Primary Examiner* — Edward Urban
*Assistant Examiner* — Golam Sorowar
(74) *Attorney, Agent, or Firm* — Oblon, Spivak, McClelland, Maier & Neustadt, L.L.P.

(57) ABSTRACT

A technique of being capable to decrease the number of times of delivery and receipt of information on a common channel setup between a base station equipment and a base station control equipment. A communication system includes base station equipment and a base station control equipment which controls the base station equipment. The base station control equipment is capable of supplying information necessary for the common channel setup to the base station equipment, and the base station equipment produces a track-record notification signal indicating a track record of the common channel setup while performing the common channel setup on the basis of the information. The base station control equipment does not supply the information necessary for the common channel setup when receiving the track-record notification signal from the base station equipment.

8 Claims, 4 Drawing Sheets

U.S. PATENT DOCUMENTS

2005/0157658 A1* 7/2005 Ishii et al. .................... 370/252
2006/0045041 A1   3/2006 Yuuki

FOREIGN PATENT DOCUMENTS

| JP | 2002 10348  | 1/2002 |
| JP | 2004 40778  | 2/2004 |
| JP | 2004 221719 | 8/2004 |
| JP | 2004 228702 | 8/2004 |
| JP | 2004 235725 | 8/2004 |
| JP | 2006 67433  | 3/2006 |

OTHER PUBLICATIONS

"3$^{rd}$ Generation Partnership Project; Technical Specification Group Radio Access Network; Synchronisation in UTRAN Stage 2 (Release 6)", 3GPP TS 25.402 V6.3.0 pp. 15-25, (Jun. 2005).

Supplementary European Search Report in Europe Application No. EP 0673 2440 dated Dec. 27, 2011.

Ericsson, "Replacement of NBAP Procedures for Radio Resource Management: Node B Restarted and RNC Restarted," TSG-RAN Working Group 3 meeting #6, Sophia Antipolis, France, Aug. 24-27, 1999, TSGR3#6(99)925.

Motorola, "Usage of Configuration Generation ID and State Re-Sync in Audit Procedures," TSG-RAN Working Group 3 (Meeting #8) Abiko, Japan, Oct. 25-29, 1999, TSGR3#8(99) D66.

Siemens/Italtel, "NBAP: State Alignment Procedure," TSG-RAN Working Group 3 Meeting #7, Sophia Antipolis, Sep. 20-24, 1999, TSGR3#7 (99) C01.

Office Action issued in Chinese Application No. 200680055087.6 mailed on Apr. 6, 2012.

* cited by examiner

FIG. 2

BASE STATION EQUIPMENT, BASE STATION CONTROL EQUIPMENT AND COMMUNICATION SYSTEM

TECHNICAL FIELD

The present invention relates to a base station equipment, a base station control equipment which controls the base station equipment, and a communication system which includes the base station equipment and the base station control equipment.

BACKGROUND ART

Conventionally, various techniques relating to a communication system have been proposed. For example, Non-Patent Documents 1 to 4 disclose techniques relating to a communication system in which a WCDMA (Wideband Code Division Multiple Access) method proposed by a group called 3GPP (3rd Generation Partnership Project) is utilized.

In addition, Non-Patent Documents 5 and 6 disclose techniques relating to ATM (Asynchronous Transfer Mode), and Patent Documents 1 to 3 discloses techniques relating to a TDMA (Time Division Multiple Access) communication system and a CDMA communication system.

Non-Patent Document 1: 3GPP TS 25.402 V6.3.0, 2006. 6
Non-Patent Document 2: 3GPP TS 25.433 V6.8.0, 2005. 12
Non-Patent Document 3: 3GPP TS 25.401 V6.7.0, 2005. 10
Non-Patent Document 4: 3GPP TS 25.931 V7.0.0, 2006. 3
Non-Patent Document 5: ITU-T Recommendation Q2631.1
Non-Patent Document 6: ITU-T Recommendation Q2631.1
Patent Document 1: Japanese Patent Application Laid-Open No. 2002-10348
Patent document 2: Japanese Patent Application Laid-Open No. 2004-235725
Patent Document 3: Japanese Patent Application Laid-Open No. 2004-221719

In the conventional communication system, a link between a base station equipment and a base station control equipment which controls the base station equipment is tentatively disconnected during maintenance work. When the link between the base station equipment and the base station control equipment is established again, in order to perform uplink and downlink common channel setups, it is necessary that delivery and receipt of information be performed many times between the base station equipment and the base station control equipment. Therefore, the system takes a long time to restart.

DISCLOSURE OF THE INVENTION

In order to solve the above problem, an object of the present invention is to provide a technique of being able to decrease the number of times of the delivery and receipt of information on the common channel setup between the base station equipment and the base station control equipment.

A first base station equipment according to the present invention in a communication system includes a common channel setup unit which performs a common channel setup based on information supplied from a base station control equipment; and an output unit which supplies a notification signal indicating a track record of the common channel setup in the common channel setup unit to the base station control equipment.

A second base station equipment according to the present invention in a communication system includes a common channel setup unit which performs setups of a plurality of kinds of common channels based on a plurality of kinds of pieces of information supplied from a base station control equipment; a determination unit determines whether or not a supply from the base station control equipment is required for each of the plurality of kinds of pieces of information; and an output unit which supplies a notification signal indicating a kind of information necessary to be supplied from the base station control equipment in the plurality of kinds of pieces of information or a notification signal indicating a kind of information unnecessary to be supplied from the base station control equipment in the plurality of kinds of pieces of information to the base station control equipment.

A first base station control equipment according to the present invention which controls a base station equipment in a communication system includes an output unit which is capable of supplying necessary information when the base station equipment performs a common channel setup; and an input unit which accepts a notification signal indicating a track record of the common channel setup in the base station equipment, the notification signal being supplied from the base station equipment, wherein the information is not supplied from the output unit when the notification signal is accepted by the input unit.

A second base station control equipment according to the present invention which controls a base station equipment in a communication system includes an output unit which is capable of supplying a plurality of kinds of pieces of necessary information when the base station equipment performs setups of a plurality of kinds of common channels; an input unit which accepts a notification signal indicating a kind of information necessary to be supplied from the base station control equipment in the plurality kinds of pieces of information or a notification signal indicating a kind of information unnecessary to be supplied from the base station control equipment in the plurality of kinds of pieces of information, the notification signal being supplied from the base station equipment; and an output determination unit which individually determines whether or not each of the plurality of kinds of pieces of information is supplied from the output unit based on the notification signal.

A first communication system according to the present invention includes a base station equipment; and a base station control equipment which controls the base station equipment, wherein the base station control equipment is capable of supplying information necessary to perform a common channel setup to the base station equipment, the base station equipment produces a notification signal indicating a track record of the common channel setup while performing the common channel setup based on the information, and the base station control equipment does not supply the information when receiving the notification signal from the base station equipment.

A second communication system according to the present invention includes a base station equipment; and a base station control equipment which controls the base station equipment, wherein the base station control equipment is capable of supplying a plurality of kinds of pieces of information necessary to perform setups of a plurality kinds of common channels to the base station equipment, the base station equipment performs the setups of the plurality of kinds of common channels based on the plurality of kinds of pieces of information, the base station equipment determines whether or not a supply from the base station control equipment is required for each of the plurality of kinds of pieces of information, the base station equipment produces a notification signal indicating a kind of information necessary to be supplied from the base station control equipment in the plurality of kinds of pieces of information or a notification signal indicating a kind of information unnecessary to be supplied from the base station control equipment in the plurality of kinds of pieces of information, and the base station control equipment individually determines whether or not each of the plurality of kinds of pieces of information is supplied based on the notification signal when receiving the notification signal from the base station equipment.

In the first base station equipment according to the present invention, because the notification signal indicating the track record of the common channel setup in the base station equipment is supplied to the base station control equipment, it is not necessary that the base station control equipment supply the information necessary for the common channel setup in the base station equipment. Accordingly, the number of times of the delivery and receipt of information on the common channel setup can be decreased between the base station equipment and the base station control equipment, thereby reducing communication load between the base station equipment and the base station control equipment.

In the second base station equipment according to the present invention, the notification signal indicating the kind of the information necessary to be supplied from the base station control equipment in the plurality of kinds of the pieces of information for the common channel setup or the notification signal indicating the kind of the information unnecessary to be supplied from the base station control equipment in the plurality of kinds of the pieces of information is supplied to the base station control equipment, so that the base station control equipment can supply only the information which is actually required on the base station equipment side in the plurality of kind of the pieces of information necessary for the common channel setup. Therefore, the number of times of the delivery and receipt of information on the common channel setup can be decreased between the base station equipment and the base station control equipment, thereby reducing the communication load between the base station equipment and the base station control equipment.

In the first base station control equipment and first communication system according to the present invention, when the notification signal indicating the track record of the common channel setup in the base station equipment is fed into the base station control equipment, the information necessary for the common channel setup in the base station equipment is not supplied from the base station control equipment. Accordingly, the number of times of the delivery and receipt of information on the common channel setup can be decreased between the base station equipment and the base station control equipment, thereby reducing the communication load between the base station equipment and the base station control equipment.

In the second base station control equipment and second communication system according to the present invention, the base station control equipment individually determines whether or not each of the plurality of kinds of the pieces of information is supplied on the basis of the notification signal, supplied from the base station equipment, which indicates the kind of the information necessary to be supplied from the base station control equipment in the plurality of kinds of the pieces of information for the common channel setup or the notification signal, supplied from the base station equipment, which indicates the kind of the information unnecessary to be supplied from the base station control equipment in the plurality kinds of the pieces of information. Therefore, only the information which is actually required on the base station equipment side in the plurality kind of the pieces of information necessary for the common channel setup can be fed into the base station equipment. Accordingly, the number of times of the delivery and receipt of information on the common channel setup can be decreased between the base station equipment and the base station control equipment, thereby reducing communication load between the base station equipment and the base station control equipment.

Other and further objects, features, aspects, and advantages of the present invention will become more apparent from the following description and the accompanying drawings.

BEST MODES FOR CARRYING OUT THE INVENTION

First Embodiment

Figure 1:
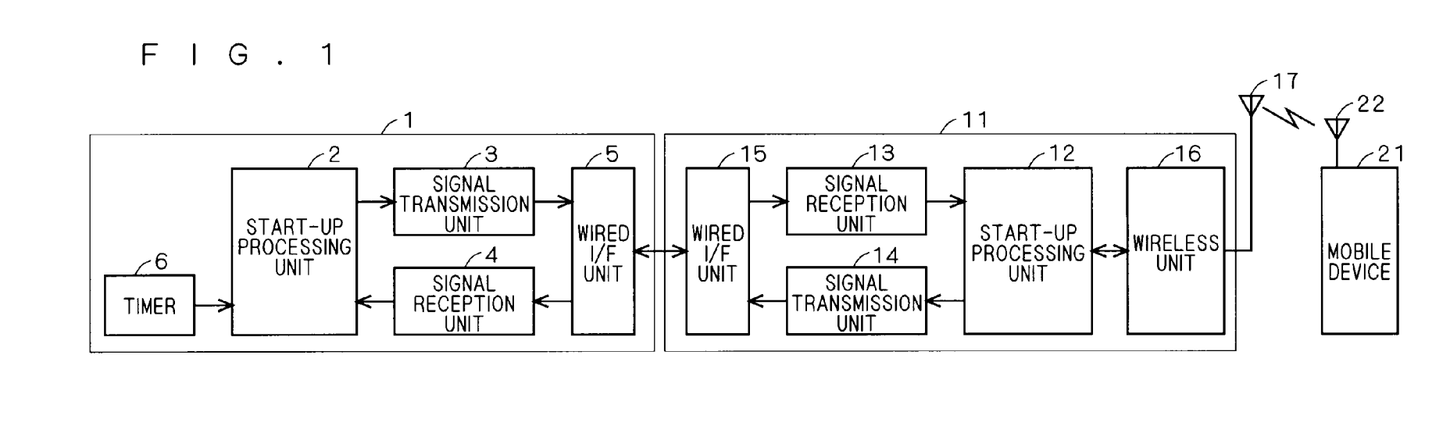
FIG. 1 is a block diagram showing a configuration of a communication system according to a first embodiment of the present invention.

FIG. 1 is a block diagram showing a configuration of a communication system according to a first embodiment of the present invention. The communication system of the first embodiment is a WCDMA communication system proposed by a group called 3GPP, and the communication system is designed pursuant to technical specifications such as Non-Patent Documents 1 to 4.

As shown in FIG. 1, the communication system of the first embodiment includes a base station equipment 11 called node B in the 3GPP specification and a base station control equipment 1 called RNC (Radio Network Controller) in the 3GPP specification. The base station equipment 11 conducts wireless communication with a mobile device 21, and the base station control equipment 1 controls the base station equipment 11. The base station control equipment 1 and the base station equipment 11 are connected by a cable. Generally, a plurality of base station equipments 11 are connected to one base station control equipment 1, and at least 1000 base station equipments 11 are connected to the base station control equipment 1 in the case of the compact base station equipment 11.

In the base station control equipment 1, a start-up processing unit 2 produces a transmission signal. For example, the start-up processing unit 2 produces a signal including information necessary for a common channel setup performed in the base station equipment 11. At this point, transmission timing of the transmission signal is determined with a timer 6. A signal transmission unit 3 performs framing processing, for example CRC (Cyclic Redundancy Check) coding that is defined by a system to the transmission signal produced by the start-up processing unit 2, and the transmission signal is fed into a wired I/F unit 5. The wired I/F unit 5 performs transmission processing of the transmission signal such that the transmission signal is adapted to a supporting communication protocol, and the wired I/F unit 5 transmits the transmission signal to the base station equipment 11. In the first embodiment, the base station control equipment 1 and the base station equipment 11 conduct wired communication with each other using an ALCAP (Access Link Control Application Part) protocol in ATM. Accordingly, the wired I/F unit 5 and a wired I/F unit 15 of the base station equipment 11, to be described later, are adhered to the ALCAP protocol. In the first embodiment, the base station control equipment 1 and the base station equipment 11 are connected by ATM. Alternatively, the base station control equipment 1 and the base station equipment 11 may be connected by IP (Internet Protocol).

In the base station control equipment 1, a signal reception unit 4 performs deframing processing to a signal which is supplied from the base station equipment 11 through the wired I/F unit 5, and the signal is fed into the start-up processing unit 2. The start-up processing unit 2 analyzes the signal supplied from the base station equipment 11, and the start-up processing unit 2 performs predetermined processing according to the signal.

In the base station equipment 11, the wired I/F unit 15 receives a signal supplied from the base station control equipment 1. A signal reception unit 13 performs deframing processing to the signal received with the wired I/F unit 15, and the signal is fed into a start-up processing unit 12. The start-up processing unit 12 analyzes the signal supplied from the signal reception unit 13, and produces a signal transmitted to the base station control equipment 1. The start-up processing unit 12 provides a command to a wireless unit 16 to ensure a wireless resource to be described later. The start-up processing unit 12 produces a signal transmitted to the mobile device 21, and transmits a signal received from the mobile device 21 to a signal transmission unit 14. As described later, the start-up processing unit 12 acts as a common channel setup unit which performs the uplink and downlink common channel setups. A wireless unit 16 modulates the signal which is produced by the start-up processing unit 12 and transmitted to the mobile device 21, the wireless unit 16 converts a frequency into a transmission frequency and performs power amplification, and the wireless unit 16 transmits the transmission signal at a predetermined frequency through an antenna 17. The signal transmitted from the base station equipment 11 is receives by an antenna 22 of the mobile device 21.

On the other hand, a signal supplied from the antenna 22 of the mobile device 21 is fed into the wireless unit 16 through the antenna 17. The wireless unit 16 performs frequency conversion of the signal into a predetermined low frequency, the wireless unit 16 demodulates the signal, and the signal is fed into the start-up processing unit 12. The signal transmission unit 14 performs the framing processing to both the signal received from the mobile device 21 and the signal transmitted to the base station control equipment 1, and the signals are transmitted from the wired I/F unit 15 to the base station control equipment 1.

Figure 2:
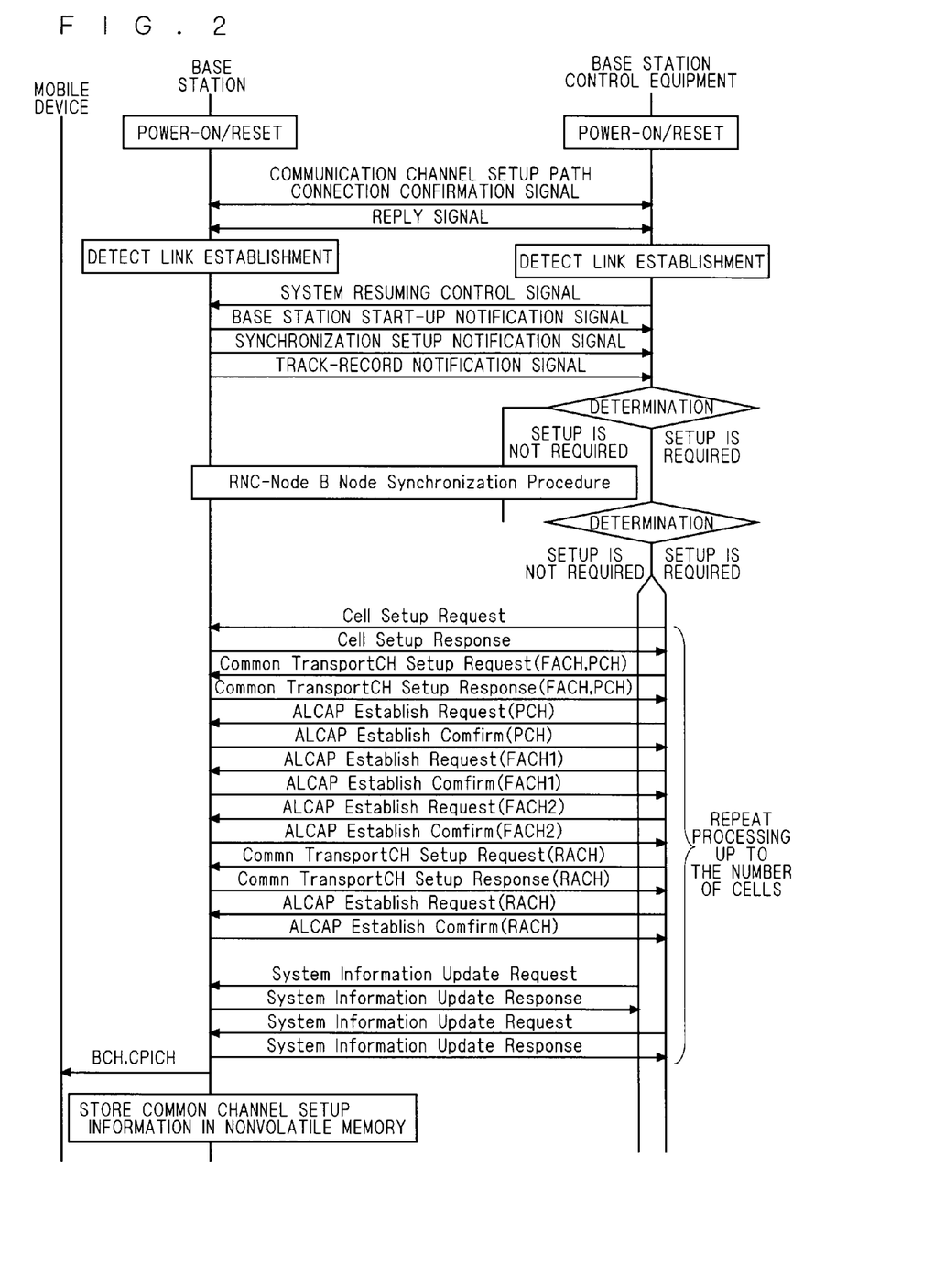
FIG. 2 is a view showing an operation sequence of the communication system of the first embodiment of the present invention.

Then, start-up processing performed by the communication system of the first embodiment will be described. FIG. 2 is a view showing operation sequences of the base station control equipment 1 and base station equipment 11 during the start-up processing. The following processing described with reference to FIG. 2 is performed between each base station equipment 11 and the base station control equipment 1 when the base station control equipment 1 manages the plurality of base station equipments 11.

As shown in FIG. 2, when the base station control equipment 1 is powered on again after powered off from a power-on state, or when the base station control equipment 1 is reset while remaining in the power-on state, the start-up processing unit 2 produces a communication channel setup path connection confirmation signal for establishing an ATM link (or IP link) with the base station equipment 1, and the start-up processing unit 2 supplies the communication channel setup path connection confirmation signal to the base station equipment 1. In the base station equipment 11, when the communication channel setup path connection confirmation signal is fed into the start-up processing unit 12, the start-up processing unit 12 produces a reply signal indicating that the communication channel setup path connection confirmation signal is received, and the reply signal is supplied. The reply signal is fed into the start-up processing unit 2 of the base station control equipment 1. Therefore, each of the start-up processing unit 2 of the base station control equipment 1 and the start-up processing unit 12 of the base station equipment 11 can detect that the ATM link (or IP link) is established between the devices.

On the other hand, when the base station equipment 11 is powered on again after powered off from a power-on state, or when the base station equipment 11 is reset while remaining in the power-on state, the start-up processing unit 12 produces the communication channel setup path connection confirmation signal, and supplies the communication channel setup path connection confirmation signal to the base station control equipment 1. In the base station control equipment 1, when the communication channel setup path connection confirmation signal is fed into the start-up processing unit 2, the start-up processing unit 2 produces the reply signal, and the reply signal is supplied. The reply signal is fed into the start-up processing unit 12 of the base station equipment 11. Therefore, each of the start-up processing unit 2 of the base station control equipment 1 and the start-up processing unit 12 of the base station equipment 11 can detect that the ATM link (or IP link) is established between the devices.

When both the base station control equipment 1 and the base station equipment 11 are newly powered on or reset, both the devices supply the communication channel setup path connection confirmation signals, and both the devices supply the reply signals.

When the base station control equipment 1 establishes the link with the base station equipment 11 after newly powered on or reset, the start-up processing unit 2 produces a system resuming control signal for notifying the base station equipment 11 of a command to initialize the 3GPP specification setup, and the system resuming control signal is supplied to the base station equipment 11. In the base station equipment 11, when the system resuming control signal is fed into the start-up processing unit 12, the start-up processing unit 12 initializes the 3GPP specification setup, the start-up processing unit 12 produces a base station start-up notification signal indicating that the initialization is completed, and the base station start-up notification signal is supplied to the base station control equipment 1.

Sometimes the base station equipment 11 voluntarily produces and supplies the base station start-up notification signal without receiving the system resuming control signal from the base station control equipment 1. For example, when only the base station equipment 11 is newly powered on or reset, the base station equipment 11 initializes the 3GPP specification setup after the link with the base station control equipment 1 is established again, and the base station equipment 11 supplies the base station start-up notification signal to the base station control equipment 1. When the base station equipment 11 detects that a router line with the base station control equipment 1 is disconnected after the link with the base station control equipment 1 is established, the base station control equipment 1 initializes the 3GPP specification setup to supply the base station start-up notification signal to the base station control equipment 1. The base station equipment 11 periodically supplies a predetermined signal to the base station control equipment 1, and the base station equipment 11 can determine that the router line is disconnected when the base station control equipment 1 does not send back a reply signal for the signal for a predetermined time.

When the base station equipment 11 supplies the base station start-up notification signal, the start-up processing unit 12 determines whether or not a synchronization setup between the base station equipment 11 and the base station control equipment 1 is required. When the synchronization setup is required, the start-up processing unit 12 produces a synchronization setup notification signal indicating that the synchronization setup is required. When a high-accuracy clock signal can be obtained in the base station equipment 11, and when the base station equipment 11 and the base station control equipment 1 are continuously operated without resetting the devices despite the fact that the router line between the devices is disconnected, because the synchronization is ensured between the base station equipment 11 and the base station control equipment 1, the base station equipment 11 determines that the synchronization setup between the base station equipment 11 and the base station control equipment 1 is not required. Examples of the case in which the high-accuracy clock signal can be obtained in the base station equipment 11 include the case in which the base station equipment 11 includes a high-accuracy clock source, the case in which the base station equipment 11 includes a GPS receiver, and the case in which the high-accuracy clock signal can be extracted from a signal, which is adhered to ATM (or IP), transmitted from the wired I/F unit 15 of the base station control equipment 1. In the base station equipment 11, when the start-up processing unit 12 produces the synchronization setup notification signal, and the synchronization setup notification signal is supplied from the wired I/F unit 15 to the base station control equipment 1.

In the base station equipment 11, the start-up processing unit 12 determines whether or not a track record of the common channel setup in the start-up processing exists. When the track record exists, the start-up processing unit 12 produces a track-record notification signal indicating that the track record exists. The base station equipment 11 supplies the track-record notification signal from the wired I/F unit 15 to the base station control equipment 1. That is, the wired I/F unit 15 acts as an output unit which supplies the track-record notification signal. Therefore, the base station control equipment 1 can recognize the track record of the common channel setup in the base station equipment 11, and the base station control equipment 1 does not need to supply the information necessary for the common channel setup. Accordingly, the number of times of the delivery and receipt of information on the common channel setup can be decreased between the base station equipment and the base station control equipment.

When receiving the base station start-up notification signal from the base station equipment 11, the base station control equipment 1 determines whether or not the synchronization setup with the base station equipment 11 is required in the start-up processing unit 2. Specifically, the start-up processing unit 2 confirms whether or not the synchronization setup notification signal is received within a predetermined time using the timer 6. When the synchronization setup notification signal is received within the predetermined time, the base station control equipment 1 determines that the synchronization setup with the base station equipment 11 is not required. When the synchronization setup notification signal is not received within the predetermined time, the base station control equipment 1 determines that the synchronization setup with the base station equipment 11 is required. Therefore, the base station control equipment 1 is adaptable to both the conventional base station equipment 11 which does not support the synchronization setup notification signal and the base station equipment 11 of the first embodiment which supports the synchronization setup notification signal, so that an influence on the already-existing system can be minimized to improve flexibility of system architecture.

When the base station control equipment 1 determines that the synchronization setup with the base station equipment 11 is required, the base station control equipment 1 synchronizes with the base station equipment 11 by performing a procedure (hereinafter referred to as "node synchronization procedure") called "RNC-Node B Node Synchronization Procedure" described in Non-Patent Document 1 between the base station control equipment 1 and the base station equipment 11. In the procedure, the base station control equipment 1 transmits a predetermined control frame including a parameter T1 to the base station equipment 11, and the base station equipment 11 which receives the control frame transmits a predetermined control frame including parameters T2 and T3 to the base station control equipment 1. At this point, the parameter T1 indicates timing at which the control frame including the parameter T1 is transmitted from the base station control equipment 1. The parameter T2 indicates timing at which the control frame including the parameter T1 received by the base station equipment 11, and the parameter T3 indicates timing at which a control frame including the parameter T3 is transmitted from the base station equipment 11. Therefore, the base station control equipment 1 can obtain a round-trip delay to synchronize with the base station equipment 11.

On the other hand, when the base station control equipment 1 determines that the synchronization setup with the base station equipment 11 is not required, the base station control equipment 1 neglects the node synchronization procedure to perform the next processing.

When the base station control equipment 1 performs or neglects the node synchronization procedure, the start-up processing unit 2 of the base station control equipment 1 determines whether or not the base station control equipment 1 needs to supply the information necessary for the common channel setup to the base station equipment 11. Specifically, using the timer 6, the start-up processing unit 2 confirms whether or not the track-record notification signal is received within the predetermined time. When the track-record notification signal is received within the predetermined time, the start-up processing unit 2 determines that the base station control equipment 1 needs to supply the information necessary for the common channel setup to the base station equipment 11. When the track-record notification signal is not received within the predetermined time, the start-up processing unit 2 determines that the base station control equipment 1 does not need to supply the information. Therefore, similarly to the synchronization setup notification signal, the base station control equipment 1 is adaptable to both the conventional base station equipment 11 which does not support the track-record notification signal and the base station equipment 11 of the first embodiment which supports the track-record notification signal, so that the influence on the already-existing system can be minimized to improve the flexibility of the system architecture.

When the base station control equipment 1 needs to newly synchronize with base station equipment 11 due to a change in system specification, or when the base station control equipment 1 needs to newly supply the information necessary for the common channel setup to the base station equipment 11 due to a change in system specification, the base station control equipment 1 does not accept the synchronization setup notification signal and the track-record notification signal even if the synchronization setup notification signal and the track-record notification signal is received from the base station equipment 11, the base station control equipment 1 determines that the synchronization setup with the base station equipment 11 is required, and the base station control equipment 1 determines that the supply of the information necessary for the common channel setup is required.

When the base station control equipment 1 determines that the information necessary for the common channel setup should be supplied to the base station equipment 11, the start-up processing unit 2 produces various messages including the information, and the start-up processing unit 2 supplies the various messages to the base station equipment 11. In the base station equipment 11, the start-up processing unit 12 performs the common channel setup on the basis of the information. A common channel setup procedure during the start-up processing will specifically be described below. The following various messages are described in Non-Patent Documents 2 to 4.

The base station control equipment 1 supplies a Cell Setup Request message to the base station equipment 11. The base station equipment 11 performs the common channel setup necessary to construct a cell on the basis of the Cell Setup Request message.

For example, the Cell Setup Request message includes information necessary to set a primary CPICH (Common Pilot Channel) which is a downlink common channel in the physical channel. Specifically, the Cell Setup Request message includes a Primary Scrambling code which is a code for identifying the cell and frame timing transmitted through the primary CPICH, channel transmission power value, a channel transmission frequency and the like. The base station equipment 11 sets the transmission power, transmission frequency and the like in the object common channel such as the primary CPICH to construct the new cell according to the pieces of information. In the base station equipment 11, when the construction of the cell is completed, the start-up processing unit 12 produces a Cell Setup Response message indicating that the construction of the cell is completed, and the Cell Setup Response message is supplied to the base station control equipment 1.

Then, the base station control equipment 1 supplies a Common Transport Channel Setup Request message relating to FACH (Forward Access Channel) and PCH (Paging Channel) to the base station equipment 11. FACH and PCH are downlink common channels in the transport channel. The base station equipment 11 performs FACH and PCH setups relating to an NBAP (Node B Application Part) protocol on the basis of the Common Transport Channel Setup Request message.

The Common Transport Channel Setup Request message includes information necessary for the common channel setup relating to NBAP protocol, such as a data size of the common channel of the setup object, control information actually transmitted through the channel, and a diffusion code used to encode the channel. The base station equipment 11 sets the data size and the like in the common channel of the setup object, that is, FACH and PCH on the basis of the information. When the setup is completed, the start-up processing unit 12 produces a Common Transport Channel Setup Response message indicating that the setup is completed, and the base station equipment 11 supplies the Common Transport Channel Setup Response message to the base station control equipment 1.

Then, the base station control equipment 1 supplies an ALCAP Establish Request message relating to PCH to the base station equipment 11. The base station equipment 11 performs a PCH setup relating to the ALCAP protocol on the basis of the ALCAP Establish Request message.

The ALCAP Establish Request message includes information necessary for the common channel setup relating to the ALCAP protocol, such as Binding ID individually allocated to the common channel of the setup object and information on communication quality of the common channel. The base station equipment 11 allocates the Binding ID in the common channel of the setup object, that is, PCH on the basis of the information. When the common channel setup is completed, the start-up processing unit 12 produces an ALCAP Establish Confirm message indicating that the common channel setup is completed, and the ALCAP Establish Confirm message is supplied to the base station control equipment 1. Therefore, a route setup is completed for PCH, and the signal can be transmitted and received for PCH in a U-plane in which user information is transmitted.

Then, the base station control equipment 1 supplies an ALCAP Establish Request message relating to FACH1. Similarly to PCH, the base station equipment 11 performs an FACH1 setup relating to the ALCAP protocol on the basis of the ALCAP Establish Request message. When the FACH1 setup is completed, the base station equipment 11 supplies an ALCAP Establish Confirm message indicating that the FACH1 setup is completed to the base station control equipment 1. Therefore, the route setup is completed for FACH1, and the signal can be transmitted and received for FACH1 in the U-plane in which the user information is transmitted.

Then, the base station control equipment 1 supplies an ALCAP Establish Request message relating to FACH2. Similarly to PCH and the like, the base station equipment 11 performs an FACH2 setup relating to the ALCAP protocol on the basis of the ALCAP Establish Request message. When the FACH2 setup is completed, the base station equipment 11 supplies an ALCAP Establish Confirm message indicating that the FACH2 setup is completed to the base station control equipment 1. Therefore, the route setup is completed for FACH2, and the signal can be transmitted and received for FACH2 in the U-plane in which the user information is transmitted.

Then, the base station control equipment 1 supplies a Common Transport Channel Setup Request message relating to RACH (Random Access Channel) to the base station equipment 11. RACH is an uplink common channel in the transport channel. Similarly to FACH and PCH, the base station equipment 11 performs an RACH setup relating to the NBAP protocol on the basis of the Common Transport Channel Setup Request message. When the RACH setup is completed, the base station equipment 11 supplies a Common Transport Channel Setup Response message indicating that RACH setup is completed to the base station control equipment 1.

Then, the base station control equipment 1 supplies an ALCAP Establish Request message relating to RACH. Similarly to PCH and the like, the base station equipment 11 performs RACH setup relating to the ALCAP protocol on the basis of the ALCAP Establish Request message. When the RACH setup is completed, the base station equipment 11 supplies an ALCAP Establish Confirm message indicating that RACH setup is completed to the base station control equipment 1. Therefore, the route setup is completed for RACH, and the signal can be transmitted and received for RACH in the U-plane in which the user information is transmitted.

Then, the base station control equipment 1 supplies a System Information Update Request message. The base station equipment 11 performs BCH (Broadcast Channel) setup on the basis of the System Information Update Request message. BCH is a downlink common channel in the transport channel.

The System Information Update Request message includes broadcast information, and the base station equipment 11 sets the broadcast information at BCH as the new broadcast information. In the base station equipment 11, when the BCH setup is completed, the start-up processing unit 12 produces a System Information Update Response message, and the System Information Update Response message is supplied to the base station control equipment 1.

The common channel setup procedure during the start-up processing is repeated by the same number of times as the number of cells managed by one base station equipment 11. That is, the common channel setup procedure is repeated by the same number of times as a number obtained by multiplying the number of frequency kinds allocated to one sector and the number of sectors managed by one base station equipment 11. Accordingly, as the number of cells is increased, the number of times of the deliver and receipt of information on the common channel setup is increased between the base station equipment 11 and the base station control equipment 1.

When the base station control equipment 1 supplies the System Information Update Request message relating to the last cell, the base station control equipment 1 adds a command for releasing the restrictions on the communication between the base station equipment 11 and the mobile device 21 to the broadcast information in the System Information Update Request message. In the base station equipment 11, the communication with the mobile device 21 is restricted when the setup relating to the 3GPP specification is initialized after the notification of the system resuming control signal from the base station control equipment 1, or when the setup relating to the 3GPP specification is voluntarily initialized. When receiving the System Information Update Request message including a restriction releasing command from the base station control equipment 1, the base station equipment 11 transmits CPICH while transmitting information indicating the restriction release to the mobile device 21 in BCH. Therefore, in the mobile device 21, a position of the base station equipment 11 can be registered and the communication with the base station equipment 11 can be resumed. Then, the base station equipment 11 stores the setup information on the common channel such as FACH and PCH. The base station equipment 11 includes a nonvolatile memory, and the setup information on the common channel is stored in the nonvolatile memory. Therefore, the base station equipment 11 becomes the state in which the track record of the common channel setup exists. After that, the base station equipment 11 always supplies the track-record notification signal after newly supplying the base station start-up notification signal.

Then, an operation sequence in the case where the base station control equipment 1 determines that the supply of the information necessary for the common channel setup to the base station equipment 11 is not required will be described below. When the base station control equipment 1 determines that the supply of the information necessary for the common channel setup to the base station equipment 11 is not required, the base station control equipment 1 does not supply the pieces of information necessary for the common channel setup such as the Cell Setup Request message and the Common Transport Channel Setup Request message except for BCH, but the base station control equipment 1 supplies the System Information Update Request message to the base station equipment 11 up to the same number of times as the number of cells. That is, in such cases, the series of operation sequences from the supply of Cell Setup Request message from the base station control equipment 1 to the supply of the ALCAP Establish Confirm message relating to RACH from the base station equipment 11 are not performed. Then, the series of operation sequence is referred to as "common channel setup sequence".

As described above, when the base station control equipment 1 supplies the System Information Update Request message relating to the last cell, the base station control equipment 1 adds the command for releasing the controls on the communication between the base station equipment 11 and the mobile device 21 to the broadcast information on the System Information Update Request message.

When receiving the System Information Update Request message, similarly the base station equipment 11 performs the BCH setup on the basis of the System Information Update Request message. When the BCH setup is completed, the base station equipment 11 supplies the System Information Update Response message to base station control equipment 1. When receiving the System Information Update Request message including the restriction releasing command from the base station control equipment 1, the base station equipment 11 transmits CPICH while transmitting the information indicating the restriction release in BCH to the mobile device 21. Therefore, in the mobile device 21, the position of the base station equipment 11 can be registered and the communication with the base station equipment 11 can be resumed.

When the base station equipment 11 does not supply the track-record notification signal, that is, when the base station equipment 11 determines that the track record of the common channel setup exists, the base station equipment 11 performs the setup of the common channel (such as FACH and PCH), of which the setup is necessary during the start-up processing, except for BCH by utilizing the currently-stored setup information on the common channel.

In the first embodiment, the base station control equipment 1 is notified of the track-record notification signal independently of other signals. Alternatively, the base station control equipment 1 may be notified of the track-record notification signal by utilizing the signal indicating another piece of information. A plurality of examples of the case described above will be described below.

Usually, in order that the base station control equipment 1 manages software or hardware version in the base station equipment 11, the base station equipment 11 notifies the base station control equipment 1 of the version information on the base station equipment 11 after the ATM link (or IP link) is established. The base station control equipment 1 may be notified of the track-record notification signal by utilizing an unused bit of a plurality of bits constituting the signal indicating the version information. For example, the signal indicating the version information is formed by eight-bit data, the highest-order bit of the eight-bit data is not used, and the track-record notification signal is expressed by setting the highest-order bit at "1". When the version number of which the base station control equipment 1 should be notified is "5", the base station control equipment 1 can be notified of not only the version information but also the track-record notification signal by transmitting "10000101" to the base station control equipment 1.

When the track record of the common channel setup during the start-up processing exists in the base station equipment 11, sometimes it is not necessary that the base station control equipment 1 be notified of the version information on the base station equipment 11. In such cases, when the track record of the common channel setup does not exist, the base station control equipment 1 is notified of the version information by the conventional method. When the track record of the common channel setup exists, the base station control equipment 1 may be notified of not the version information but only the track-record notification signal by utilizing the signal originally indicating the version information. For example, when the signal indicating the version information is formed by the eight-bit data, the track-record notification signal is expressed by utilizing the whole of the eight-bit data. Specifically, the eight-bit data is set at a sufficiently large value, for example, "11111111" which does not express the version number even if the version is updated, and the base station control equipment 1 is notified of the data of "11111111" as the track-record notification signal. Sometimes the version information on the base station equipment 11 is transmitted while included in the base station start-up notification signal.

For another example, sometimes the information on abilities of the base station equipment 11, for example, compatibility with HSDPA (High Speed Downlink Packet Access) and a scale (the number of stages of adaptable IFFT/FFT and adaptable diffusion ratio) of a modem portion is also transmitted from the base station equipment 11 to the base station control equipment 1 after the ATM link (or IP link) is established. Therefore, the base station control equipment 1 may be notified of the track-record notification signal by utilizing the unused bit of the plurality of bits constituting the signal indicating the information. Specifically, the track-record notification signal may be expressed by empty bits of the signal constituting a Resource Status Indication message described in Non-Patent Document 2.

For still another example, sometimes processing for confirming the usage state of the resource in the base station equipment 11 to check whether or not the resource breaks down is performed. The base station control equipment 1 may be notified of the track-record notification signal by utilizing the unused bit of the signal used at the time. Specifically, the track-record notification signal may be expressed by empty bits of the signal constituting an Audit Required Indication message or an Audit Response message described in Non-Patent Document 2.

The same holds true for the synchronization setup notification signal, and the base station control equipment 1 may be notified of the synchronization setup notification signal by utilizing the signal indicating another piece of information.

Thus, the base station equipment 11 notifies the base station control equipment 1 of the track-record notification signal and the synchronization setup notification signal by utilizing the signal indicating another piece of information, so that the number of times of the delivery and receipt of information can be decreased between the base station equipment 11 and the base station control equipment 1 to realize reduction of a network load and shortening of the system start-up time.

Thus, in the first embodiment, when the track-record notification signal indicating the track record of the common channel setup in the base station equipment 11 is fed into the base station control equipment 1, the base station control equipment 1 does not supply the information necessary for the common channel setup in the base station equipment 11. Accordingly, the number of times of the delivery and receipt of information on the common channel setup can be decreased between the base station equipment 11 and the base station control equipment 1. Therefore, the communication load is reduced between the base station equipment 11 and the base station control equipment 1. It is necessary to perform the common channel setup up to the same number of times as the number of cells. Therefore, it is significantly effective when the number of cells is increased.

In the first embodiment, during the start-up processing, the number of times of the delivery and receipt of information on the common channel setup can be decreased between the base station equipment 11 and the base station control equipment 1, so that the start-up time of the base station equipment 11 can be shortened to early resume the communication between the mobile device 21 and the base station equipment 11.

In performing network IP of the base station equipment 11, because the base station equipment 11 and the base station control equipment 1 are frequently powered on and off and reset in development work and debug work, the development work and debug work can efficiently be performed. Additionally, when the link with the IP line is disconnected, or when a trouble is generated in a hub relaying the base station equipment 11 and the base station control equipment 1, a time until the base station equipment 11 and the mobile device can be connected by performing recovery processing to resume system operation can be shortened.

There is a possibility of installing the base station equipment 11 in home in the future. In such cases, it is assumed that a user frequently powers on and off the base station equipment 11. When the start-up time of the base station equipment 11 is too long, the user feels uncomfortable like the case in which it takes several minutes to start up a current DVD player. Accordingly, the shortening of the start-up time of the base station equipment 11 has a number of advantages.

In recovery from electric power outage generated in a specific area, the plurality of base station equipments 11 are started up all together. The network load can effectively be reduced at the time.

Second Embodiment

Figure 3:
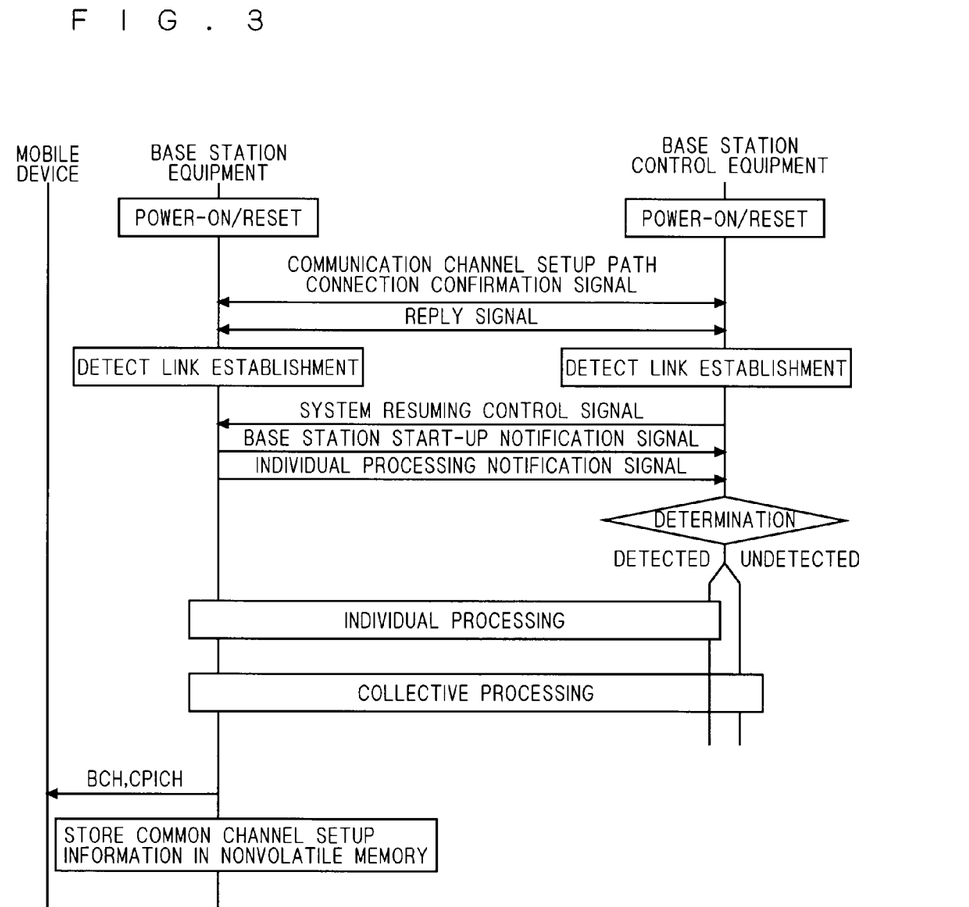
FIG. 3 is a view showing an operation sequence of a communication system according to a second embodiment of the present invention.
Figure 4:
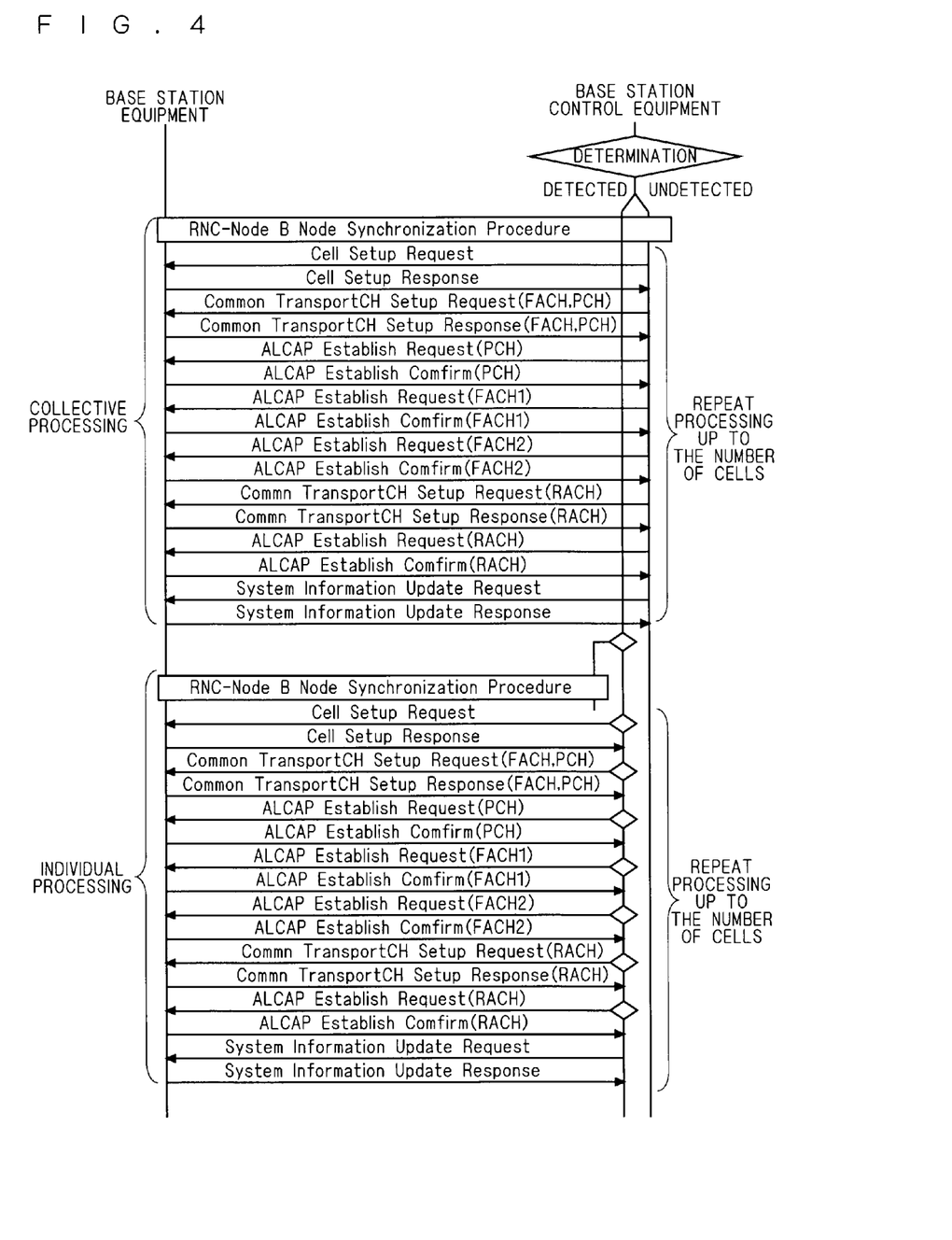
FIG. 4 is a view showing an operation sequence of the communication system of the second embodiment of the present invention.

FIGS. 3 and 4 show operation sequences during start-up processing of a communication system according to a second embodiment of the present invention. The communication system of the second embodiment differs from the communication system of the first embodiment in that the operations of the base station control equipment 1 and base station equipment 11 are changed in the start-up processing. The start-up processing of the second embodiment will be described below with reference to FIGS. 3 and 4.

As shown in FIG. 3, when the base station control equipment 1 is newly powered on, or when the base station control equipment 1 is reset while remaining in the power-on state, similarly to the first embodiment, the base station control equipment 1 supplies the communication channel setup path connection confirmation signal to the base station equipment 1. When receiving the communication channel setup path connection confirmation signal, the base station equipment 1 supplies the reply signal to the base station control equipment 1. Therefore, each of the base station control equipment 1 and the base station equipment 11 can detect that the ATM link (or IP link) is established again between the devices.

On the other hand, when the base station equipment 1 is newly powered on, or when the base station equipment 11 is reset while remaining in the power-on state, similarly to the first embodiment, the base station equipment 11 supplies the communication channel setup path connection confirmation signal to the base station control equipment 1. When receiving the communication channel setup path connection confirmation signal, the base station control equipment 1 supplies the reply signal to the base station control equipment 1. Therefore, each of the base station control equipment 1 and the base station equipment 11 can detect that the ATM link (or IP link) is established between the devices.

After the base station control equipment 1 is newly powered on or reset, when the base station control equipment 1 detects that the link with the base station equipment 11 is established, similarly to the first embodiment, the base station control equipment 1 supplies the system resuming control signal to the base station equipment 11. When receiving the system resuming control signal, similarly to the first embodiment, the base station equipment 11 initializes the setup relating to the 3GPP specification to supply the base station start-up notification signal to the base station control equipment 1.

Similarly to the first embodiment, sometimes the base station equipment 11 voluntarily produces and supplies the base station start-up notification signal without receiving the system resuming control signal from the base station control equipment 1.

When the base station equipment 11 supplies the base station start-up notification signal, the start-up processing unit 12 produces an individual processing notification signal, and the individual processing notification signal is supplied to the base station control equipment 1. The individual processing notification signal is a signal which indicates performance of individual processing to be described later.

When the base station control equipment 1 receives the base station start-up notification signal from the base station equipment 11, the start-up processing unit 2 determines whether or not the individual processing notification signal is detected within a predetermined time using the timer 6. When the individual processing notification signal cannot be detected because the individual processing notification signal is not received within the predetermined time, the base station control equipment 1 performs collective processing, to be described later, between the base station control equipment 1 and the base station equipment 11. On the other hand, when the individual processing notification signal can be detected because the individual processing notification signal is received within the predetermined time, the base station control equipment 1 performs individual processing between the base station control equipment 1 and the base station equipment 11. Thus, based on the determination whether or not the individual processing notification signal is detected within the predetermined time, the base station control equipment 1 is adaptable to both the conventional base station equipment 11 which does not support the individual processing notification signal and the base station equipment 11 of the second embodiment which supports the individual processing notification signal. Therefore, the influence on the already-existing system can be minimized to improve the flexibility of the system architecture.

FIG. 4 is a view showing operation sequences of the base station control equipment 1 and base station equipment 11 when the individual processing and the collective processing are performed. First the collective processing will be described. As shown in FIG. 4, when the individual processing notification signal cannot be detected, the base station control equipment 1 performs the node synchronization procedure between the base station control equipment 1 and the base station equipment 11. Then, the common channel setup sequence described in the first embodiment is performed between the base station control equipment 1 and the base station equipment 11. The base station control equipment 1 supplies the System Information Update Request message described in the first embodiment to the base station equipment 11. Similarly to the first embodiment, the base station equipment 11 performs a BCH setup on the basis of the System Information Update Request message. When the BCH setup is completed, the base station equipment 11 supplies the System Information Update Response message to the base station control equipment 1. The common channel setup sequence and the BCH setup processing are performed up to the same number of times as the number of cells managed by the base station equipment 11.

When the base station control equipment 1 supplies the System Information Update Request message relating to the last cell, similarly to the first embodiment, the base station control equipment 1 adds the command for releasing the restrictions on the communication between the base station equipment 11 and the mobile device 21 to the broadcast information of the System Information Update Request message. When receiving the System Information Update Request message including the restriction releasing command from the base station control equipment 1, the base station equipment 11 transmits CPICH while transmitting the information indicating the restriction release to the mobile device 21 in BCH as shown in FIG. 3. Therefore, in the mobile device 21, the position of the base station equipment 11 can be registered and the communication with the base station equipment 11 can be resumed. Then, the base station equipment 11 stores the setup information on the common channel in the nonvolatile memory.

Then, the individual processing will be described. In the base station equipment 11, the start-up processing unit 12 individually determines whether or not the supply from the base station control equipment 1 is required for each of a plurality of kinds of pieces of information supplied from the base station control equipment 1 in performing the node synchronization procedure and the common channel setup sequence in each cell managed by the base station equipment 11. That is, the start-up processing unit 12 acts as a determination unit which individually determines whether or not the supply from the base station control equipment 1 is required for each of the plurality of kinds of pieces of information. The start-up processing unit 12 produces a necessary information list indicating the determination result, and supplies the necessary information list while adding the necessary information list to the individual processing notification signal. For example, when the start-up processing unit 12 determines that the supplies of the Common Transport Channel Setup Request message relating to FACH and PCH, the ALCAP Establish Request message relating to FACH1, the ALCAP Establish Request message relating to FACH2, and the ALCAP Establish Request message relating to PCH from the base station control equipment 1 are required for a certain cell, the information specifying each of the kinds of the messages are described in the necessary information list while coupling to the information specifying the corresponding cell. Accordingly, for the node synchronization procedure and the common channel setup sequence, the kind of the information which the base station control equipment 1 needs to supply to the base station equipment 11 is described in the individual processing notification signal in each cell. The individual processing notification signal is supplied to the base station control equipment 1 from the wired I/F unit 15 which acts as the output unit.

As described in the first embodiment, when the high-accuracy clock signal can be obtained in the base station equipment 11, and when the base station equipment 11 and the base station control equipment 1 are continuously operated without resetting the devices despite the fact that the router line between the devices is disconnected, because the synchronization is ensured between the base station equipment 11 and the base station control equipment 1, the start-up processing unit 12 determines that the information supplied from the base station control equipment 1 is not required in performing the node synchronization procedure, and the kind of the information is not written in the necessary information list. On the other hand, when the base station control equipment 1 or the base station equipment 11 is powered off or reset, it is necessary to establish the synchronization between the base station equipment 11 and the base station control equipment 1. Therefore, the start-up processing unit 12 determines that the information supplied from the base station control equipment 1 is required in performing the node synchronization procedure, and the kind of the information is written in the necessary information list.

When the object common channel setup is performed in past times on the basis of the Cell Setup Request message relating to a certain cell and the setup information on the common channel is stored, and when an elapsed time since the setup information is stored exists within a predetermined time, the start-up processing unit 12 determines that the setup information is valid, and determines that the new supply of the Cell Setup Request message is not required for the cell, and the kind of the message is not written in the necessary information list. On the other hand, when the Cell Setup Request message is not received from the base station control equipment 1 in past times for a certain cell, when the elapsed time since the setup information is stored in performing the object common channel setup in past times based on the Cell Setup Request message exceeds the predetermined time, the start-up processing unit 12 determines that the new supply of the Cell Setup Request message from the base station equipment 11 is required for the cell, and the kind of the message is written in the necessary information list along with the information specifying the cell.

Similarly to the Cell Setup Request message, the start-up processing unit 12 can determine whether or not the supply from the base station control equipment 1 is required for other messages such as the Common Transport Channel Setup Request message relating to FACH and PCH. The start-up processing unit 12 writes the kind of the message necessary to be supplied in the necessary information list along with the information specifying the corresponding cell and does not write the kind of the message unnecessary to be supplied in the necessary information list.

In the start-up processing unit 12, the value of the predetermined time used to determine whether or not the stored setup information on the common channel is valid is individually set in each message.

When the cell managed by the base station equipment 11 is added, because the base station control equipment 1 needs to supply all the pieces of information necessary to perform the node synchronization procedure and the common channel setup sequence with regard to the new cell, the base station equipment 11 writes the kinds of all the pieces of information supplied from the base station control equipment 1 in the necessary information list along with the information specifying the new cell when the node synchronization procedure and the common channel setup sequence are performed to the new cell.

On the other hand, with regard to all the cells managed by the base station equipment 11, when the base station equipment 11 determines that the supply is not required for all the pieces of information supplied from the base station control equipment 1 when the node synchronization procedure and the common channel setup sequence are performed, the individual processing notification signal is not produced nor supplied to base station control equipment 1. Accordingly, in such cases, the collective processing is performed.

Thus, the individual processing notification signal including the necessary information list is supplied to the base station control equipment 1, which allows the base station control equipment 1 to supply only the information actually necessary on the side of the base station equipment 11 in the plurality of kinds of pieces of information necessary for the common channel setup. Therefore, the number of times of the delivery and receipt of information on the common channel setup can be decreased between the base station equipment and the base station control equipment, thereby reducing the communication load between the base station equipment and the base station control equipment.

When the wired I/F unit 5 which acts as the input unit accepts the individual processing notification signal, as shown in FIG. 4, the base station control equipment 1 refers to the necessary information list described in the accepted individual processing notification signal, and the start-up processing unit 2 determines whether or not the information (message) supplied to the base station control equipment 1 in performing the node synchronization procedure is actually supplied with regard to the object cell. That is, with regard to the object cell, when the kind of the information, supplied to the base station equipment 11 in performing the node synchronization procedure is described in the necessary information list, the start-up processing unit 12 supplies the information, and the node synchronization procedure is performed between the base station control equipment 1 and the base station equipment 11. On the other hand, with regard to the object cell, when the kind of the information supplied to the base station equipment 11 in performing the node synchronization procedure is not described in the necessary information list, the information is not supplied.

Then, the base station control equipment 1 refers to the necessary information list described in the individual processing notification signal, and the start-up processing unit 2 determines whether or not the Common Transport Channel Setup Request message relating to FACH and PCH in the object cell is supplied. When the start-up processing unit 2 determines the Common Transport Channel Setup Request message is supplied, the Common Transport Channel Setup Request message is supplied to the base station equipment 11. When the start-up processing unit 2 determines the Common Transport Channel Setup Request message is not supplied, the supply of the Common Transport Channel Setup Request message is not performed. When receiving the Common Transport Channel Setup Request message relating to FACH and PCH, the base station equipment 11 supplies the Common Transport Channel Setup Response message relating to FACH and PCH to the base station control equipment 1.

Similarly, the base station control equipment 1 refers to the necessary information list for each of other messages relating to common channel setup sequence in the object cell, and the start-up processing unit 2 individually determines whether or not the messages are supplied to the base station equipment 11. When the start-up processing unit 2 determines that the message is supplied, the message is supplied to the base station equipment 11. When the start-up processing unit 2 determines that the message is not supplied, the supply of the message is not performed. When receiving the message, the base station equipment 11 supplies the corresponding response message such as the Common Transport Channel Setup Response message to the base station control equipment 1.

Then, the base station control equipment 1 supplies the System Information Update Request message to the base station equipment 11. The base station equipment 11 performs BCH setup on the basis of the received System Information Update Request message. When the BCH setup is completed, the base station equipment 11 supplies the System Information Update Response message to the base station control equipment 1.

The supply determination of each message relating to the common channel setup sequence and the BCH setup processing are performed up to the same number of times as the number of cells managed by the base station equipment 11.

In the individual processing, the base station control equipment 1 also adds the command for releasing the restricts on the communication between the base station equipment 11 and the mobile device 21 to the broadcast information of the System Information Update Request message, when the base station control equipment 1 supplies the System Information Update Request message relating to the last cell. When receiving the System Information Update Request message including the restrict releasing command from the base station control equipment 1, the base station equipment 11 transmits CPICH while transmitting the information indicating the restrict release to the mobile device 21 in BCH as shown in FIG. 3. Therefore, in the mobile device 21, the position of the base station equipment 11 can be registered and the communication with the base station equipment 11 can be resumed. Then, the base station equipment 11 stores the setup information on the newly-set common channel in the nonvolatile memory.

Similarly to the synchronization setup notification signal and track-record notification signal of the first embodiment, the individual processing notification signal of the second embodiment may be provided independently of other signals, or the base station control equipment 1 may be notified of the individual processing notification signal by utilizing an unused bit of another signal. In the latter case, the number of times of the delivery and receipt of information can be decreased between the base station equipment 11 and the base station control equipment 1 to realize the reduction of the network load and the shortening of the system start-up time.

Thus, in the base station equipment 11 of the communication system of the second embodiment, the start-up processing unit 12 determines whether or not the supply from the base station control equipment is required for each of plurality of kinds of the pieces of information which are necessary to set the plurality of kinds of the common channel and which are supplied from the base station control equipment 1. Then, the wired I/F unit 15 supplies, to the base station control equipment 1, the individual processing notification signal that indicates the kind of the information which the base station control equipment 1 needs to supply in the plurality of kinds of the pieces of information. In the base station control equipment 1, the wired I/F unit 5 accepts the individual processing notification signal supplied from the base station equipment 11, and the start-up processing unit 2 individually determines, on the basis of the necessary information list in the individual processing notification signal, whether or not each of the plurality of kinds of the pieces of information necessary for the common channel setup in the base station equipment 11 is supplied. Accordingly, the base station control equipment 1 can supply only the information which is actually required on the side of the base station equipment 11 in the plurality of kinds of the pieces of information necessary for the common channel setup to the base station equipment 11. Therefore, the number of times of the delivery and receipt of information on the common channel setup can be decreased between the base station equipment 11 and the base station control equipment 1, thereby reducing the communication load between the base station equipment 11 and the base station control equipment 1.

In the second embodiment, during the start-up processing, the number of times of the delivery and receipt of information on the common channel setup is decreased between the base station equipment 11 and the base station control equipment 1, so that the start-up time of the base station equipment 11 can be shortened to early resume the communication between the mobile device 21 and the base station equipment 11.

Even if the cell managed by the base station equipment 11 is newly added, because the description concerning the cell is written in the necessary information list of the individual processing notification signal, the system expansion can be realized while the base station equipment 11 is operated.

In the second embodiment, the base station equipment 11 individually determines whether or not the supply from the base station control equipment 1 is required for each of the plurality of kinds of the pieces of information supplied from the base station control equipment 1 in performing the node synchronization procedure and the common channel setup sequence, and the base station equipment 11 produces the necessary information list indicating the determination result. Alternatively, the base station equipment 11 individually determines whether or not the supply from the base station control equipment 1 is not required for each of the plurality of kinds of the pieces of information, and may produce an unnecessary information list indicating the determination result. That is, the kind of the information which the base station control equipment 1 does not need to supply to base station equipment 11 may be described in the individual processing notification signal in the node synchronization procedure and the common channel setup sequence. Even in such cases, the base station control equipment 1 refers to the unnecessary information list described in the received individual processing notification signal, and can determine whether or not the necessary information is supplied in performing the node synchronization procedure or the common channel setup sequence. Therefore, the similar effect can be obtained.

In the first and second embodiments, the base station equipment 11 stores the setup information on the common channel in the nonvolatile memory. Alternatively, the base station equipment 11 may store the setup information on the common channel in a volatile memory. In such cases, because the stored setup information is erased when the base station equipment 11 is powered off, it is necessary that the base station equipment 11 receive the information necessary for the common channel setup from the base station control equipment 1 again. When the base station equipment 11 is reset while remaining in the power-on state, because the same operation can be realized, the similar effect is generated. When the setup information on the common channel is stored in the volatile memory, desirably the setup information is stored while a CRC code is imparted to the setup information, and a CRC check is performed to the setup information to confirm validity of the setup information after the link is established between the base station equipment 11 and the base station control equipment 1.

Although the embodiments of the present invention are described in detail, the embodiments are described only by way of example. The present invention is not limited to the embodiment. It is to be understood that various modifications and changes can be made without departing from the scope of the present invention.

The invention claimed is:

1. A base station equipment in a communication system, said base station equipment comprising:
   a common channel setup unit which performs a common channel setup based on information necessary to perform the common channel setup, said information supplied from a base station control equipment after a link between said base station control equipment and said base station equipment is established;

a production unit which, when the link between said base station control equipment and said base station equipment is disconnected and then established again, determines whether a track record of the common channel setup exists in said common channel setup unit, and when it is determined that said track record exists, produces a notification signal indicating said track record; and an output unit which supplies said notification signal to said base station control equipment, wherein said base station control equipment does not supply said information when receiving said notification signal from said base station equipment after the link between said base station control equipment and said base station equipment is established, and said base station control equipment supplies said information when not receiving said notification signal from said base station equipment after the link between said base station control equipment and said base station equipment is established.

2. The base station equipment according to claim 1, wherein said base station control equipment re-supplies said information when said track record does not exist.

3. The base station equipment according to claim 1, wherein said base station control equipment is powered on after being powered off from a power-on state.

4. The base station equipment according to claim 1, wherein said base station control equipment is reset while remaining in a power-on state.

5. A base station control equipment which controls a base station equipment in a communication system, said base station control equipment comprising:
    an output unit which is capable of supplying necessary information when said base station equipment performs a common channel setup; and
    an input unit which accepts a notification signal indicating a track record of said common channel setup in said base station equipment, said notification signal being supplied from said base station equipment when said base station equipment determines that said track record exists,
    wherein said base station equipment performs the common channel setup based on said information supplied from said output unit after a link between said base station control equipment and said base station equipment is established,
    when the link between said base station control equipment and said base station equipment is disconnected and then established again, said base station equipment determines whether a track record of the common channel setup exists, and when it is determined that said track record exists, supplies said notification signal to said base station control equipment,
    said information is not supplied from said output unit when said notification signal is accepted by said input unit after a link between said base station control equipment and said base station equipment is established, and
    said information is supplied from said output unit when said notification signal is not accepted by said input unit after the link between said base station control equipment and said base station equipment is established.

6. The base station control equipment according to claim 5, wherein said notification signal is not accepted when there is a change in a specification of the communication system that includes said base station equipment.

7. A communication system, comprising:
a base station equipment; and
a base station control equipment which controls said base station equipment,
wherein said base station control equipment is capable of supplying information necessary to perform a common channel setup to said base station equipment,
said base station equipment performs the common channel setup based on said information supplied from said base station control equipment after a link between said base station control equipment and said base station equipment is established,
when the link between said base station control equipment and said base station equipment is disconnected and then established again, said base station equipment determines whether a track record of the common channel setup exists, and when it is determined that said track record exists, produces a notification signal indicating said track record,
said base station control equipment does not supply said information when receiving said notification signal from said base station equipment after the link between said base station control equipment and said base station equipment is established, and
said base station control equipment supplies said information when not receiving said notification signal from said base station equipment after the link between said base station control equipment and said base station equipment is established.

8. The communication system according to claim 7, wherein said base station control equipment re-supplies said information when said track record does not exist.

* * * * *